3,225,032
DERIVATIVES OF DIBENZ[b,f]AZEPINES
Henri Dietrich, Arlesheim, and Werner Küng, Allschwil, Basel-Land, Switzerland, assignors to Geigy Chemical Corporation, New York, N.Y., a corporation of Delaware
No Drawing. Filed Aug. 31, 1964, Ser. No. 393,432
Claims priority, application Switzerland, Apr. 8, 1961, 4,159/61, 4,160/61
7 Claims. (Cl. 260—239)

The present application is a continuation-in-part of copending application, Serial No. 185,519, filed April 6, 1962.

This invention relates to new derivatives of dibenz[b,f]-azepines which have valuable pharmacological properties.

The novel dibenz[b,f]azepine derivatives according to the invention are compounds of the formula

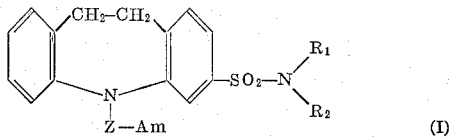

wherein
$R_1$ and $R_2$ represent lower alkyl radicals which can be bound to each other directly or by way of an oxygen atom,
Z represents a straight or branched-chain alkylene radical having 2–6 carbon atoms, and
Am represents a lower alkylamino or di(lower-alkyl)-amino group and wherein a lower alkyl radical of Am can be bound directly to the alkylene radical Z or both lower alkyl radicals of a di-lower alkylamino group Am can be bound to each other directly or by way of an oxygen atom and their non-toxic acid addition salts, And possess, as valuable pharmacological properties, adrenolytic, antiemetic and reserpine-antagonistic activity.

The term "lower" alkyl as used in this specification and the appended claims, means alkyl radicals having from 1 to 4 carbon atoms, e.g. methyl, ethyl, propyl, isopropyl, etc.

In Formula I, $R_1$ and $R_2$ represent, for example, methyl, ethyl, n-propyl or n-butyl radicals or, together with the adjacent nitrogen atom, they form, for example, the 1-pyrrolidinyl, piperidino or 4-morpholinyl radical. Z is, for example, an ethylene, propylene, trimethylene, methylene radical and Am is, for example, a methylamino, ethylamino, n-propylamino, isopropylamino, n-butylino, ethylamino, n-propylamino, isopropylamino, n-butylamino, dimethylamino, methylethylamino, diethylamino, methyl-n-propylamino, methyl-isopropylamino, di-n-butylamino, diisobutylamino, 1-pyrrolidinyl, piperidino, hexamethyleneimino or 4-morpholinyl radical. In addition, Am together with Z can represent, e.g. the β-(1-methyl-2-pyrrolidinyl)-ethyl, 1-methyl-3-pyrrolidinyl-methyl, β-(1-methyl-2-piperidinyl)-ethyl, 1-methyl-3-piperidinylmethyl or 1-methyl-4-piperidinyl radical.

To produce the new compounds of Formula I, a reactive ester of a compound of the formula

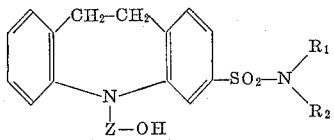

wherein $R_1$, $R_2$ and Z have the meanings given above, in particular a halide, e.g. a chloride or bromide or, in addition, a p-toluene sulfonic acid ester, is reacted with an amine of the formula

Am—H   (III)

wherein Am has the meaning given above, in those cases where there is no bond between a lower alkyl radical of Am and Z. The reaction can be performed, for example, at a moderately raised temperature of, e.g. 60–120° C., in an inert solvent such as e.g. a lower molecular alkanol or alkanone. It is advantageous to use an excess of the amine to be reacted as acid binding agent. The reaction is sometimes to be performed in a closed vessel depending on the boiling point of the amine and of the solvent used as well as on the reaction temperature necessary.

Reactive esters of compounds of Formula II are obtained, for example, by reacting alkali metal derivatives of suitable 3-sulfamyl-iminodibenzyls the sulfamyl radical of which is disubstituted, with alkylene oxides and reacting the hydroxyalkyl derivatives obtained with inorganic acid halides, methane sulfonic acid chloride or with arylsulfonic acid chlorides, whereupon 5-halogenalkyl-, 5-methanesulfonyloxyalkyl- or 5-arylsulfonyloxyalkyl-3-sulfamyl-iminodibenzyls disubstituted in the sulfamyl group are obtained. Such compounds, however, can also be obtained in one step by reacting alkali metal compounds of 3-dialkylsulfamyl-iminodibenzyls with non-geminal dihalogen alkanes, particularly those having two different halogen atoms, or with arylsulfonic acid halogen esters. The reactive esters of compounds of Formula II can be reacted with, for example dimethylamine, methylethylamine, diethylamine, di-n-butylamine, methylamine, ethylamine, n-propylamine, n-butylamine, pyrrolidine, piperidine, hexamethyleneimine or morpholine.

Compounds of Formula I are obtained by a further process by treating a compound of the formula

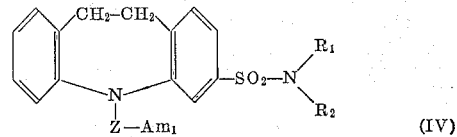

wherein $Am_1$ represents the primary amino group or a lower monoalkylamino group the alkyl radical of which can also be bound to Z and $R_1$, $R_2$ and Z have the meanings given above, with an agent introducing a lower alkyl. Starting materials of Formula IV are obtained, for example, by reacting a reactive ester of a compound of Formula II with ammonia analogously to the previous process, or with a lower monoalkylamine according to this process. They are also obtained, e.g. by reduction or hydrogenation of a 5-cyanoalkyl-3-sulfamyl-iminodibenzyl disubstituted in the sulfamyl group. As lower alkylating agents can be employed, e.g. dimethyl sulfate, diethyl sulfate, methyl iodide, ethyl iodide, ethyl bromide, n-propyl bromide, p-toluene sulfonic acid methyl ester and 2,4-dinitrobenzene sulfonic acid methyl ester in the presence of acid binding agents such as, e.g. sodium or potassium carbonate, and of an inert organic solvent. Also, for example, formaldehyde in the presence of formic acid can be used.

A third process for the production of compounds of Formula I wherein the group Am does not contain a reactive hydrogen atom, consists in reacting, in the presence of a basic condensing agent, a compound of the formula

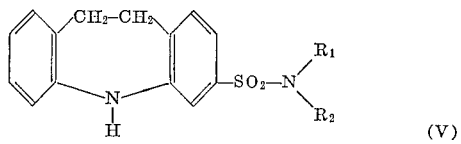

wherein $R_1$ and $R_2$ have the meaning given above, with a reactive ester of an aminoalcohol of the formula $$HO—Z—Am_2 \qquad (VI)$$

wherein $Am_2$ has the meaning given above for Am with the exception of a lower alkylamino group, and Z has the meaning given above.

Examples of starting materials of Formula V are 3-dimethylsulfamyl - iminodibenzyl, 3-diethylsulfamyl-iminodibenzyl, 3-piperidinosulfonyl-iminodibenzyl and 3-(4'-morpholinyl) - sulfonyl-iminodibenzyl. These and other homologous and isomeric compounds are obtained, e.g. starting from 3-amino-5-acetyl-iminodibenzyl by converting this into the corresponding diazonium chloride and treating the latter, in acetic acid after addition of copper-II-chloride, with sulfur dioxide, precipitating the 3-chlorosulfonyl-5-acetyl-iminodibenzyl by dilution with water and reacting with a suitable lower dialkylamine, with piperidine or morpholine and, finally, splitting off the acetyl radical by partial hydrolysis by means of ethanolic or methanolic potassium hydroxide solution.

As reactive esters of aminoalcohols of Formula VI, the halides in particular are employed, as e.g. the chlorides, bromides or iodides; individually can be named: β - dimethylamino - ethyl chloride, β - diethylamino-ethyl chloride, β-methylethylamino-ethyl chloride, β-dimethylamino-propyl chloride, β-dimethylamino-isopropyl chloride, γ-dimethylamino-propyl chloride, γ-dimethylamino-butyl chloride, δ-dimethylamino-butyl chloride, γ-dimethylamino - β-methyl-propyl chloride, α-methyl-γ-dimethylamino-n-amyl chloride, β-(di-n-propylamino)-ethyl chloride, β-(methyl-isopropylamino)-ethyl chloride, β-(di-n-butylamino) - ethyl chloride, β - (diisobutylamino)-ethyl chloride, β-(1-pyrrolidinyl)-ethyl chloride, β-piperidino-ethyl chloride, γ - (1 - pyrrolidinyl) - propyl chloride, γ-piperidino-propyl chloride, β-(4-morpholinyl)-ethyl chloride, γ-(4-morpholinyl)-propyl chloride, β-(1-methyl-2-pyrrolidinyl) - ethyl chloride, β - (1-methyl-2-piperidyl)-ethyl chloride and (1-methyl-3-piperidyl)-methyl chloride, as well as the corresponding bromides and iodides, and the corresponding alkane- and arylsulfonic acid esters.

Iminodibenzyl derivatives of Formula I are produced by a fourth process by heating a compound of Formula VII

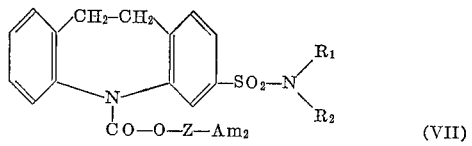

wherein $R_1$, $R_2$ Z and $Am_2$ have the meanings given above, until one mol of carbon dioxide is split off. The compounds of Formula VII are obtained in their turn, for example, by treating 3-sulfamyliminodibenzyls disubstituted in the sulfamyl group with phosgene and reacting the disubstituted 3 - sulfamyl - 5 - chlorocarbonyl-iminodibenzyls obtained with aminoalcohols of Formula VI.

Finally, compounds of Formula I wherein Am is a lower alkylamino group the alkyl radical of which can also be bound directly to Z, are obtained by reacting a compound of the formula

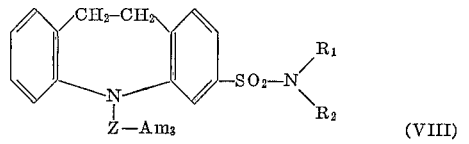

wherein $Am_3$ represents a N-arylmethyl-loweralkylamino group or an N-acyl-loweralkylamino group the alkyl radical of which can also be bound directly to Z, and $R_1$, $R_2$ and Z have the meanings given above, with either catalytically activated hydrogen or with a hydrolyzing agent depending on the meaning of $Am_3$. For example, compounds of Formula VIII wherein $Am_3$ is an arylmethyl radical such as the benzyl radical, are reacted with hydrogen in the presence of Raney nickel at temperatures up to about 80° C. and pressures up to about 50 atm., until substantially an equimolar amount of hydrogen has been taken up. The acyl radical in the group $Am_3$, e.g. a formyl-, acetyl-, benzoyl-, carbomethoxy-, carbethoxy-, chlorocarbonyl-, cyano- or methanesulfonyl radical can be hydrolytically split off, for example, by treatment with alkali metal hydroxides at a raised temperature in higher boiling organic solvents containing hydroxyl groups such as, e.g. ethylene glycol or diethylene glycol or their lower monoalkyl ethers, or in lower alkanols. The reaction in lower alkanols is preferably performed in a closed vessel.

Starting materials of Formula VIII are obtained, for example, analogously to some of the processes given above for the production of compounds of Formula I. In particular, reactive esters of compounds of Formula II can be reacted analogously to the first process mentioned with N-arylmethyl-loweralkylamines or with alkali metal derivatives of N-loweralkylamides of suitable carboxylic or sulfonic acids. Also, starting materials of Formula VIII are obtained analogously to the third process mentioned by reacting compounds of Formula V with reactive esters of N-arylmethyl-loweralkylamino-alkanols or N-carbalkoxy-loweralkylaminoalkanols in the presence of a basic condensing agent. In addition, starting materials of the Formula VIII in which $Am_3$ is a acyl radical are obtained on reaction of compounds of Formula I wherein Am is a lower dialkylamino group with organic acid halides or anhydrides, in particular with carbonic acid alkyl ester halides (chloroformic acid alkyl esters), phosgene or cyanogen bromide. The starting materials so obtained contain, as acyl radicals in the group $Am_3$, in particular a carbalkoxy group, the chlorocarbonyl group or the cyano group.

The bases according to the invention form non-toxic acid addition salts, most of which are water soluble, with inorganic or organic acids such as as e.g. hydrochloric acid, hydrobromic acid, sulfuric acid, phosphoric acid, methane sulfonic acid, ethane disulfonic acid, β-hydroxyethane sulfonic acid, acetic acid, succinic acid, fumaric acid, maleic acid, malic acid, tartaric acid, citric acid, benzoic acid, salicylic acid and mandelic acid.

Particularly pharmacologically active compounds of the invention are compounds of the formula

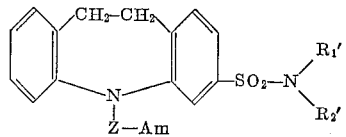

in which $R_1'$ and $R_2'$ represent, when taken together with the nitrogen atom to which they are attached, piperidino or 4-morpholinyl, but preferably each of $R_1'$ and $R_2'$ represents, independently of the other, lower alkyl;

Z is branched or straight-chain alkylene having from 2 to at most 4 carbon atoms, preferably of the grouping $$-CH_2-CH-CH_2-$$
$$\underset{H}{(CH_2)_{n-1}}$$

wherein $n$ represents 1 or 2, Am is

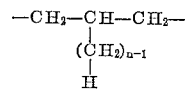

and R₃ represents hydrogen or lower alkyl, and their non-toxic pharmaceutically acceptable acid addition salts. Thus, 3-dimethylsulfamyl-5 - (3' - dimethylaminopropyl)-iminodibenzyl combines strong adrenolytic and significant reserpine-antagonistic activity. This unexpected biological profile renders this compound useful for the elevation of mood, particularly in aged persons whose physical conditions, such as vascular sclerosis, render desirable treatment with an agent possessing besides mood-elevating also adrenolytic activity and which is free from sedative side-effects.

In contrast thereto, the known 5-(3'-dimethylaminopropyl)-iminodibenzyl combines reserpine-antagonistic, anesthesia-potentiating and antihistaminic properties, and therefore, is indicated for the treatment of severe endogenous depressions.

Furthermore, 3-dimethylsulfamyl - 5 - (γ-methylaminopropyl)-iminodibenzyl possesses unexpectedly potent reserpine-antagonistic activity of quickonset, free from side effects, but no anticatatonic activity, which later would be expected in an agent which possesses twice the reserpine-antagonism of the distinctly anticatatonically active 5-(γ-methylaminopropyl)iminodibenzyl.

This means that the last-mentioned novel 3-dimethylsulfamyl compound can be used together with such well known calmatives as chloropromazine, a use which is often desirable in those cases of endogenous depression in which an excessively rapid emergence from the depressed state may be dangerous because of possible inducement of suicide.

The following examples further illustrate the production of the new compounds of Formula I according to this invention. Parts are given therein as parts by weight and their relationship to parts by volume is as that of grams (g.) to milliliters (ml.). The temperatures are in degrees centigrade.

*Example 1*

30.2 parts of 3-dimethylsulfamyl-iminodibenzyl are dissolved in 900 parts by volume of abs. xylene, 4.3 parts of sodium amide pulverized in toluene are added and the whole is stirred for 2½ hours at 120°. γ-Dimethylaminopropyl chloride (liberated from 16 parts of the hydrochloride and taken up in xylene) is added and the whole is refluxed for 19 hours. After cooling, the reaction mixture is extracted with 2 N hydrochloric acid, the reaction product is then liberated with 5 N sodium hydroxide solution and taken up in ether. After drying the solution and evaporating off the ether, an oil remains which, on standing for a considerable time, crystallizes. Recrystallized from petroleum ether, the pure 3-dimethylsulfamyl-5-(γ-dimethylaminopropyl)-iminodibenzyl melts at 66–68°.

With γ-diethylamino-propyl chloride in the place of γ-dimethylaminopropyl chloride, 3-dimethylsulfamyl-5-(γ-diethylaminopropyl)-iminodibenzyl is obtained in a similar manner.

3-piperidinosulfonyl - 5 - dimethylaminoropyl - iminodibenzyl is obtained in an analogous manner from 3-piperidinosulfonyl-iminodibenzyl and γ-dimethylaminopropyl chloride. Recrystallized from cyclohexane, it melts at 109°.

3-(4'-morpholinyl) - sulfonyl-5-(γ - dimethylaminopropyl)iminodibenzyl, produced analogously to the above example from 3-(4'-morpholinyl)-sulfonyl-iminodibenzyl and dimethylaminopropyl chloride, melts at 132–133°. The hydrochloride melts at 201–203°.

3-diethylsulfamyl-5-(γ - dimethylaminopropyl) - iminodibenzyl is obtained in an analogous manner from 3-diethylsulfamyl-iminodibenzyl and γ - dimethylaminopropyl chloride.

In an analogous manner from 3-(4'-morpholinyl)sulfonyl-iminodibenzyl and N-methylpiperidyl-2-ethyl chloride, 3 (4' - morpholinyl) - sulfonyl - 5 - (N-methylpiperidyl-2'-ethyl)-iminodibenzyl is obtained. Its hydrochloride occurs as the monohydrate and melts at 211–212.5°.

The 3-piperidinosulfonyl - 5 - (N-methylpiperidinyl-2'-ethyl)-iminodibenzyl hydrochloride monohydrate, produced in an analogous manner, melts at 165–167°.

*Example 2*

34.25 parts of 3-piperidinosulfonyl-iminodibenzyl, 19 parts of 3-dimethylamino-2-methyl-propyl chloride hydrochloride and 10 parts of sodium amide (pulverized in xylene) in 800 parts by volume of abs. xylene are refluxed for 24 hours. The base is then extracted with dilute hydrochloric acid, the extract is made alkaline with dilute sodium hydroxide solution and extracted with ether. After concentrating the dried ether solution, a yellowish residue remains which solidifies into a glass-like form (the pulverized residue melts at 54–57°).

On dissolving the residue in ether and adding ethereal hydrogen chloride solution, the hydrochloride of 3-piperidinosulfonyl - 5 - (γ - dimethylamino - β - methylpropyl)-iminodibenzyl is crystallized. The crystals thereof, which occur as the monohydrate, melt at 119–128°.

*Example 3*

40 parts of 3-dimethylsulfamyl-5-(γ-chloropropyl)-iminodibenzyl, 30 parts by volume of dimethylamine and 50 parts by volume of methanol are heated in an autoclave for 12 hours at 110°. Excess dimethylamine and methanol are removed from the reaction mixture which is then taken up in ether. The ether solution is washed with water and then extracted with 2 N hydrochloric acid. The hydrochloric acid extract is made alkaline with concentrated sodium hydroxide solution and the base which separates is again extracted with ether. The extract is washed with water and dried over sodium sulfate. After distilling off the solvent, 34 parts of crude reaction product remain from which the 3-dimethylsulfamyl-5-(γ-dimethylaminopropyl)-iminodibenzyl is isolated in the form of the hydrochloride. It melts at 189°.

On reacting 3-dimethylsulfamyl-5-(γ-chloropropyl)-iminodibenzyl with methylamine, 3-dimethylsulfamyl-5-(γ-methylaminopropyl)-iminodibenzyl is obtained in an analogous manner. The hydrochloride thereof melts at 133°.

*Example 4*

10 parts of 3-dimethylsulfamyl-5-(γ-methylaminopropyl)-iminodibenzyl are dissolved in 150 parts by volume of ethanol, 5 parts by volume of aqueous formaldehyde solution (37%) are added and the whole is refluxed for 2 hours. 3 parts of sodium borohydride are then added in portions at room temperature, the reaction mixture is stirred for 1 hour and then refluxed for a short time. After the addition of 50 parts of water, it is again refluxed whereupon the reaction mixture is concentrated to dryness. The 3-dimethylsulfamyl-5-(γ-dimethylaminopropyl)-iminodibenzyl hydrochloride is prepared from the basic portion of the reaction product. After recrystallizing twice from ethanol, it melts at 189°.

*Example 5*

21.5 parts of 3-dimethylsulfamyl-5-(γ-dimethylaminopropoxycarbonyl)-iminodibenzyl are heated to 180° under 15 Torr and the temperature is slowly raised to 220° to complete the development of carbon dioxide (about 3 hours). The basic portions isolated from the pyrolysis residue are converted into the hydrochlorides, from which, 3-dimethylsulfamyl-5-(γ-dimethylaminopropyl)-iminodibenzyl hydrochloride is obtained by recrystallization from methanol. It melts at 186–188°.

*Example 6*

6.5 parts of 3-dimethylsulfamyl-5-(β-N-methyl-N-benzylaminoethyl)-iminodibenzyl, 100 parts of dioxan, 5 parts of water and 10 parts of Raney nickel are hydrogenated for 2 hours at 80° under 30 atmospheres pressure. The reaction solution is separated from the catalyst and concentrated. After converting the crude base into the hydrochloride and recrystallizing twice from ethanol/ether, the 3 - dimethylsulfamyl-5-(β-methylaminoethyl)-iminodibenzyl hydrochloride melts at 256°.

In a similar manner, starting from 3-dimethylsulfamyl-5 - (β-N-ethyl-N-benzylaminoethyl)-iminodibenzyl, 3-dimethylsulfamyl - 5-(β-ethylaminoethyl)-iminodibenzyl is obtained.

*Example 7*

3 parts of 3-dimethylsulfamyl-5-(γ-carbethoxy-methylaminopropyl)-iminodibenzyl, 1.2 parts of potassium hydroxide and 60 parts by volume of Carbitol are refluxed for 6 hours. On working up in the usual way, 3-dimethylsulfamyl-5-(γ-methylaminopropyl)-iminodibenzyl hydrochloride is obtained from the basic part of the reaction product. It melts at 133°.

In an analogous manner as described in the foregoing examples, the following compounds are prepared:
3-dimethylsulfamyl-5-(β-dimethylaminoethyl)-iminodibenzyl and its hydrochloride, M.P. 210°,
3-dimethylsulfamyl-5-(γ-dimethylamino-β-methylpropyl)-iminodibenzyl, M.P. 111°.,
3-dimethylsulfamyl-5-(γ-pyrrolidinopropyl)-iminodibenzyl,
3-dimethylsulfamyl-5-(β-piperidinoethyl)-iminodibenzyl,
3-dimethylsulfamyl-5-[β-(4'-morpholinyl)-ethyl]-iminodibenzyl,
3-dimethylsulfamyl-5-(γ-dimethylamino-n-butyl)-iminodibenzyl, M.P. 90°,
3-dimethylsulfamyl-5-[β-(1'-methyl-piperidinyl-2')-ethyl]-iminodibenzyl, M.P. 125°,
3-dimethylsulfamyl-5-[β-(1'-methyl-pyrrolidinyl-2')-ethyl]-iminodibenzyl,
3-dimethylsulfamyl-5-(γ-methlamino-β-methyl-propyl)-iminodibenzyl, the oxalate thereof having the M.P. 216°,
3-dimethylsulfamyl-5-(β-methylethylaminoethyl)-iminodibenzyl,
3-dimethylsulfamyl-5-[β-(1'-ethyl-piperidinyl-2')-ethyl]-iminodibenzyl.

We claim:
1. An iminodibenzyl derivative selected from the class consisting of a free base and its non-toxic addition salts, said free base having the formula

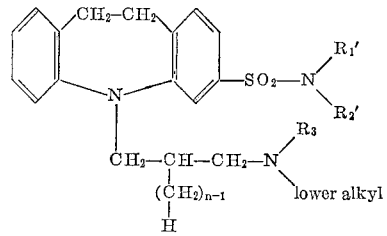

wherein each of $R_1'$ and $R_2'$ independently of the other represents lower alkyl, and $R_1'$ and $R_2'$ taken together with the nitrogen atom to which they are attached represent a member selected from the group consisting of morpholino and piperidino, $R_3$ is a member selected from the group consisting of hydrogen and lower alkyl, and $n$ is one of the integers 1 and 2.

2. 3 - dimethylsulfamyl - 5-(γ-dimethylaminopropyl) iminodibenzyl.

3. 3 - dimethylsulfamyl - 5-(γ-methylaminopropyl)-iminodibenzyl.

4. 3 - dimethylsulfamyl-5-(γ-dimethylamino-β-methylpropyl)-iminodibenzyl.

5. 3 - dimethylsulfamyl - 5-(γ-methylamino-β-methylpropyl)-iminodibenzyl.

6. 3 - piperidinosulfonyl - 5-(γ-dimethylaminopropyl)-iminodibenzyl.

7. 3 - morpholinosulfonyl-5-(γ-dimethylaminopropyl)-iminodibenzyl.

References Cited by the Examiner
UNITED STATES PATENTS

| | | | |
|---|---|---|---|
| 2,894,947 | 7/1959 | Jacob et al. | 260—243 |
| 2,928,767 | 3/1960 | Gulesich et al. | 260—243 |
| 2,985,653 | 5/1961 | Jacob et al. | 260—243 |
| 3,016,373 | 1/1962 | Saggiomo et al. | 260—243 |
| 3,068,222 | 12/1962 | Craig | 260—243 |

OTHER REFERENCES

Hollister, Ann. Internal Medicine, vol. 51, pages 1040–1041 (1959).

Schindler et al.: Helv. Chim. Acta, vol. 37, pages 472–83 (1954).

NICHOLAS S. RIZZO, *Primary Examiner.*